(12) United States Patent
Zhao et al.

(10) Patent No.: US 9,354,903 B2
(45) Date of Patent: May 31, 2016

(54) CONTROL METHOD AND ELECTRONIC DEVICE

(71) Applicants: Beijing Lenovo Software Ltd., Beijing (CN); Lenovo (Beijing) Co., Ltd., Beijing (CN)

(72) Inventors: Qian Zhao, Beijing (CN); Guowen Zhang, Beijing (CN); Yue Liu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 324 days.

(21) Appl. No.: 13/949,802

(22) Filed: Jul. 24, 2013

(65) Prior Publication Data

US 2014/0032894 A1    Jan. 30, 2014

(30) Foreign Application Priority Data

Jul. 24, 2012 (CN) .......................... 2012 1 0258666
Sep. 24, 2012 (CN) .......................... 2012 1 0358690

(51) Int. Cl.
*G06F 1/32* (2006.01)
*G06F 9/445* (2006.01)
*G06F 1/20* (2006.01)

(52) U.S. Cl.
CPC ............ *G06F 9/44505* (2013.01); *G06F 1/206* (2013.01); *G06F 1/324* (2013.01); *Y02B 60/1217* (2013.01); *Y02B 60/1275* (2013.01)

(58) Field of Classification Search
CPC ........................................... G06F 9/445
USPC .......................................... 713/100
See application file for complete search history.

(56) References Cited

U.S. PATENT DOCUMENTS

| | | | | |
|---|---|---|---|---|
| 5,274,808 A | * | 12/1993 | Miyao et al. .................. | 717/168 |
| 5,884,049 A | * | 3/1999 | Atkinson ...................... | 710/303 |
| 6,880,346 B1 | * | 4/2005 | Tseng et al. ..................... | 62/3.7 |
| 2004/0123604 A1 | * | 7/2004 | Pokharna et al. ................ | 62/3.2 |
| 2005/0038982 A1 | * | 2/2005 | Park et al. .......................... | 713/1 |
| 2007/0091560 A1 | * | 4/2007 | Parker .......................... | 361/687 |
| 2008/0263324 A1 | * | 10/2008 | Sutardja ................ | G06F 1/3203 712/43 |
| 2010/0195280 A1 | * | 8/2010 | Huang et al. ............. | 361/679.47 |

\* cited by examiner

*Primary Examiner* — Thomas Lee
*Assistant Examiner* — Sumil Desai
(74) *Attorney, Agent, or Firm* — Harness, Dickey & Pierce, P.L.C.

(57) ABSTRACT

A control method and an electronic device are disclosed in the application. The control method is applied to an electronic device including a CPU. The method includes: obtaining a current state of the electronic device; judging whether the current state is a first or a second state; generating a first control instruction in the case that the current state is the first state, or generating a second control instruction in the case that the current state is the second state; performing the first control instruction to control the operating frequency of the CPU within the first maximum operating frequency or performing the second control instruction to control the operating frequency of the CPU within the second maximum operating frequency. Enabling to regulate the maximum operating frequency of the CPU adaptively based on the current state of the electronic device.

20 Claims, 7 Drawing Sheets

The first position

The second position

CONTROL METHOD AND ELECTRONIC DEVICE

The present application claims the benefit of priority of Chinese Patent Application No. 201210358690.9, entitled "CONTROL METHOD AND ELECTRONIC DEVICE", filed with the Chinese State Intellectual Property Office on Sep. 24, 2012, and the benefit of priority of Chinese Patent Application No. 201210258666.8, entitled "ELECTRONIC DEVICE, FIRST AND SECOND ELECTRONIC DEVICE THEREOF, AND METHOD FOR SWITCHING FIRST ELECTRONIC DEVICE", field with the Chinese State Intellectual Property Office on Jul. 24, 2013, which is incorporated herein by reference in its entirety.

FIELD OF THE INVENTION

The application relates to the technical field of computer, and in particular to a control method and an electronic device.

BACKGROUND OF THE INVENTION

With increasing development of computer technology, computer products present diversity, such as the notebook computer, the separate desktop computer, the tablet computer, and the integrated desktop computers combining a display screen and a host.

In recent years, an electronic device combining a tablet computer and a notebook computer also has been proposed, that is, an electronic device has two usage states: one is the notebook computer state and the other is the tablet computer state.

In the prior art, the electronic device includes a display screen, a connection structure, and a main body including a CPU. Herein, the display screen and the main body may be rotated with respect to each other via the connection structure. The maximum operating frequency of the CPU includes a first maximum frequency and a second maximum frequency, and the first maximum frequency is higher than the second maximum frequency. In the case that the angle between the display screen and the main body is within a first preset angle range such as 180 degree, the electronic device is in the notebook computer state; in the case that the angle between the display screen and the main body is within a second preset angle range such as 360 degree, the electronic device is in the tablet computer state.

However, in the prior art, no matter the electronic device is in the tablet computer state or in the notebook computer state, the maximum operating frequency of the CPU is in the first maximum frequency. This will result in the high power consumption and high heat dissipation of the CPU. Further, the accelerated aging and even fault of the CPU will be caused.

SUMMARY OF THE INVENTION

A control method is provided according to one aspect of an embodiment of the application, and the control method is applied to an electronic device including a CPU, herein the electronic device has a first state and a second state different from the first state, and a operating frequency of the CPU includes a first maximum operating frequency matching the first state and a second maximum operating frequency matching the second state, with the first maximum operating frequency being higher than the second maximum operating frequency. The method includes: obtaining a current state of the electronic device; judging whether the current state is the first state or the second state; generating a first control instruction in the case that the current state is the first state, or generating a second control instruction in the case that the current state is the second state; and performing the first control instruction to control the operating frequency of the CPU within the first maximum operating frequency or performing the second control instruction to control the operating frequency of the CPU within the second maximum operating frequency.

Optionally, the fact that the electronic device has the first state and the second state different from the first state may include: the electronic device has a first section and a second section, and the electronic device is in the first state in the case that the relative position between the first section and the second section is in the first position; the electronic device is in the second state in the case that the relative position between the first section and the second section is in the second position different from the first position; or Optionally, the fact that the electronic device has the first state and the second state different from the first state include: the electronic device has multiple applications, and the electronic device is in the first state in the case that the number of the applications meets a first preset condition; and the electronic device is in the second state in the case that the number of the applications does not meet the first preset condition.

Optionally, the fact that the electronic device has the first state and the second state different from the first state include: the electronic device is in the first state in the case that a first operation is received by the electronic device; and the electronic device is in the second state in the case that a second operation different from the first operation is received by the electronic device.

Optionally, performing the first control instruction to control the operating frequency of the CPU within the first maximum operating frequency or performing the second control instruction to control the operating frequency of the CPU within the second maximum operating frequency, specifically may include: performing the first control instruction to output a first maximum operating clock, so that the operating frequency of the CPU is controlled within the first maximum operating frequency, wherein the first maximum operating clock corresponds to the first maximum operating frequency; or performing the second control instruction to output a second maximum operating clock, so that the operating frequency of the CPU is controlled within the second maximum operating frequency, wherein the second maximum operating clock corresponds to the second maximum operating frequency.

In another aspect, an electronic device is provided according to an embodiment of the application. The electronic device includes a CPU, and the electronic device has a first state and a second state different from the first state, the operating frequency of the CPU includes a first maximum operating frequency matching the first state and a second maximum operating frequency matching the second state, with the first maximum operating frequency being higher than the second maximum operating frequency, the electronic device further includes: an obtaining unit adapted to obtain the current state of the electronic device; a judging unit adapted to judge whether the current state of the electronic device is the first state or the second state; a generating unit adapted to generate a first control instruction in the case that the current state is the first state or generate a second control instruction in the case that the current state is the second state; a controlling unit adapted to perform the first control instruction to control the operating frequency of the CPU within the first maximum operating frequency or perform the second control instruction to control the operating frequency of the CPU within the second maximum operating frequency.

Optionally, the electronic device may further include: a first section; a connection structure; a second section, herein the first section and the second section can be rotated with respect to each other via the connection structure, the electronic device is in the first state in the case that the relative position between the first section and second section is in the first position, or the electronic device is in the second state in the case that the relative position between the first section and second section is in the second position different from the first position, or the electronic device is in the first state in the case that the electronic device is regulated from the first position to the second position, or the electronic device is in the second state in the case that the electronic device is regulated from the second position to the first position.

Optionally, the electronic device corresponds to the first state in the case that the number of the applications running on the electronic device meets a first preset condition; and the electronic device corresponds to the second state in the case that the number of the applications does not meet the first preset condition.

Optionally, the electronic device further includes: a receiving unit adapted to receive a first operation, the electronic device is in the first state in the case that the first operation is received by the electronic device; and the electronic device is in the second state in the case that a second operation different from the first operation is received by the electronic device.

Optionally, the electronic device further includes: a controlling unit adapted to perform the first control instruction to output a first maximum operating clock, so that the operating frequency of the CPU is controlled within the first maximum operating frequency, herein the first maximum operating clock corresponds to the first maximum operating frequency; or the controlling unit is also adapted to perform the second control instruction to output a second maximum operating clock, so that the operating frequency of the CPU is controlled within the second maximum operating frequency, herein the second maximum operating clock corresponds to the second maximum operating frequency.

Optionally, the first section includes:
a first case, on which a first interface is provided, the first interface is adapted to removably connected with a second interface of a second electronic device; and
a processing unit, provided in the first case,
herein a first air inlet is provided on a side of the first case connecting with the second section, and a first heat dissipation channel of the first section is formed with the first air inlet as an upstream end, and in a case that the first interface is connected with the second interface, the first air inlet communicates with a second air outlet of a second heat dissipation channel of the second section.

Optionally, a first radiator is provided in the first heat dissipation channel.

Optionally, the first radiator is a heat pipe radiator including: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

Optionally, the first section further includes:
a first detection unit, adapted to detect the connection state between the first section and the second section;

herein the processing unit is adapted to generate a switching instruction according to the connection state so as to switch the first section from a second state to a first state;

herein the first section in the first state operates in a state of first power consumption, the first section in the second state operates in a state of second power consumption, and the first power consumption is greater than the second power consumption.

The second section includes:
a second case, on which a second interface is provided, the second interface is adapted to removably connected with a first interface of a first section,
herein a second air outlet is provided on a side of the second case connecting with the first section, a second heat dissipation channel of the second section is formed with the second air outlet as a downstream end, and in a case that the second interface is connected with the first interface, the second air outlet communicates with a first air inlet of a first heat dissipation channel of the first section.

Optionally, the electronic device includes:
a first heat dissipation channel provided in the first section; and
a second heat dissipation channel provided in the second section;
herein in a case that the first section is not connected with the second section, a heat dissipation airflow passes through the first heat dissipation channel such that heat dissipation of the first section is performed; and
herein in a case that the first section is connected with the second section, a first air inlet of the first heat dissipation channel communicates with a second air outlet of the second heat dissipation channel, a heat dissipation airflow enters into the first heat dissipation channel via the second heat dissipation channel such that heat dissipation of the first section is performed by the second heat dissipation channel and the first heat dissipation channel.

Optionally, a first radiator is provided in the first heat dissipation channel.

Optionally, a second radiator is provided in the second heat dissipation channel.

Optionally, the first radiator is a heat pipe radiator including: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

Optionally, the second radiator is a semiconductor radiator including:
a semiconductor refrigerator, which has a cold surface, a hot surface and a refrigerating element disposed between the cold surface and the hot surface;
two second heat pipes, which are respectively a first pipe and a second pipe, where a condensation end of the first pipe is connected with the cold surface of the semiconductor refrigerator, an evaporation end of the second pipe is connected with the hot surface of the semiconductor refrigerator, and through flow directions of the first pipe and the second pipe are interlaced in a projection plane parallel to the cold surface and the hot surface;
two second heat dissipation fins, which are respectively a first fin and a second fin, and are respectively arranged oppositely to the first pipe and the second pipe, where the first fin is connected with an evaporation end of the first pipe and the second fin is connected with a condensation end of the second pipe; and a second fan arranged oppositely to the two second heat dissipation fins.

One or more technical solutions provided in the embodiment of the application have at least the following technical effects or advantages.

In an embodiment of the application, since the electronic device can judge whether the current state is the first state or the second state by obtaining the current state of the electronic device, and in the case that the current state is the first state, generate the first control instruction and perform the first control instruction to control the operating frequency of the CPU within the first maximum operating frequency; or in the case that the current state is the second state, generate the second control instruction and perform the second control instruction to control the operating frequency of the CPU within the second maximum operating frequency, so the maximum operating frequency of the electronic device can be reduced in a specific state. Therefore the technical problem in the prior art that an electronic device can not perform adaptive regulation on the operating frequency of the CPU based on the usage state of the electronic device is solved effectively, so that the maximum operating frequency of the CPU can be regulated adaptively based on the current state of the electronic device, the waste of processing resources can be reduced and the utilization ratio of the CPU can be improved.

Further, since the electronic device may reduce the maximum operating frequency of a CPU adaptively in the second state, thus the problem of high heat dissipation can be solved and the lifetime of the CPU can be prolonged.

Further, in an embodiment of the application, since the first state may be that the relative position between the first section and the second section of the electronic device is in the first position, may also be that the electronic device is regulated from the first position to the second position different from the first position, may also be that the number of the applications running on the electronic device meets the first preset condition, and may also be that the first operation is received by the electronic device, and since the second state may be that the relative position between the first section and the second section of the electronic device is in the second position different from the first position, may also be that the electronic device is regulated from the second position to the first position, may also be that the number of the applications running on the electronic device does not meet the first preset condition, and may also be that the second operation different from the first operation is received by the electronic device, thus in various states of the electronic device, the waste of processing resources of the CPU can be further reduced and the utilization ratio of the CPU can be further improved, and then the problem of high heat dissipation can be further solved and the lifetime of the CPU can be further prolonged.

Figure 1:
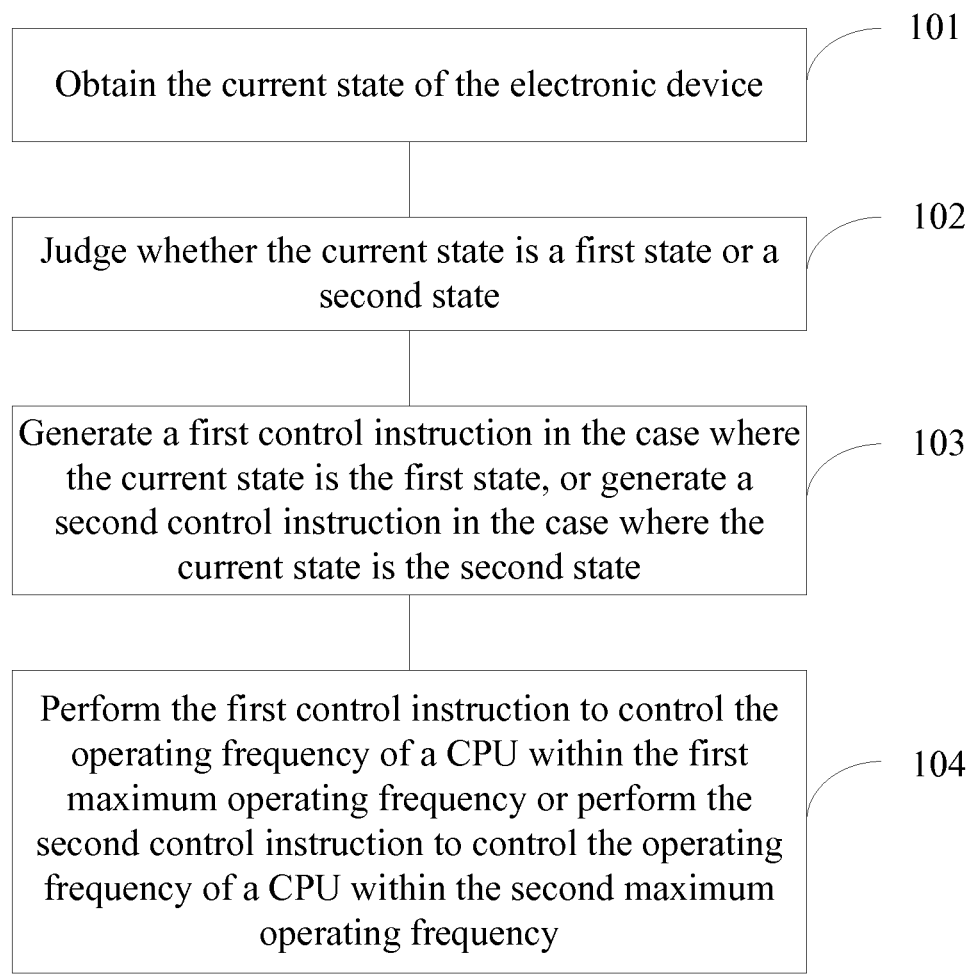
FIG. 1 is a flow chart of a control method according to a first embodiment of the application.

first portion 10, first case 11, first air inlet 111, first air outlet 112, first radiator 12, first fan 121, heat conducting plate 122, first heat pipe 123, first heat dissipation fin 124, heat pipe radiator case 125, first detection unit 13, processing unit 14 and second detection unit 15;

second portion 20, second case 21, second air outlet 211, second radiator 22, second fan 221, cold surface 222, hot surface 223, first pipe 224, second pipe 225, first fin 226, second fin 227 and semiconductor radiator case 228.

DETAILED DESCRIPTION OF THE INVENTION

The technical problem in the prior art that an electronic device can not perform adaptive regulation on the operating frequency of a CPU based on the usage state of the electronic device is solved by a control method and an electronic device provided according to an embodiment of the application.

A control method provided according to an embodiment of the application includes:

A current state of an electronic device is obtained; it is judged whether the current state is a first state or a second state; a first control instruction is generated in the case that the current state is the first state, a second control instruction is generated in the case that the current state is the second state; and a first control instruction is performed to control the operating frequency of the CPU within a first maximum operating frequency, or a second control instruction is performed to control the operating frequency of the CPU within a second maximum operating frequency, so the technical problem in the prior art that an electronic device can not perform adaptive regulation on the operating frequency of the CPU based on the usage state of the electronic device is solved effectively. Therefore the maximum operating frequency of the CPU can be regulated adaptively based on the current state of the electronic device, the waste of processing resources can be reduced and the utilization ratio of the CPU can be improved.

In order to understand the above-described technical solution better, the above-described technical solution will be described in detail in conjunction with the accompany drawings and the specific embodiments in the following.

First Embodiment

According to the embodiment, it is provided a control method, and the control method is applied to an electronic device including a CPU. Herein, the electronic device has a first state and a second state that differs from the first state, and the operating frequency of the CPU includes a first maximum operating frequency matching the first state and a second maximum operating frequency matching the second state, and the first maximum operating frequency is higher than the second maximum operating frequency.

Referring to FIG. 1, the method in the embodiment includes steps 101 to 104.

Step 101, obtaining the current state of an electronic device.

After step 101, the method in the embodiment of the application proceeds to step 102, that is, judging whether the current state is a first state or a second state. Herein, the fact that the electronic device has the first state and the second state that differs from the first state may include: the electronic device has a first section and a second section, and the electronic device is in the first state in the case that the relative position between the first section and the second section is in the first position; and the electronic device is in the second state in the case that the relative position between the first section and the second section is in the second position that differs from the first position; or the electronic device is in the first state in the case that the electronic device is regulated from the first position to the second position; and the electronic device is in the second state in the case that the electronic device is regulated from the second position to the first position.

Herein, the fact that the electronic device has the first state and the second state that differs from the first state may also include: the electronic device has multiple applications, and the electronic device is in the first state in the case that the number of the applications meets the first preset condition; and the electronic device is in the second state in the case that the number of the applications does not meet the first preset condition.

Herein, the fact that the electronic device has the first state and the second state that differs from the first state may also include: the electronic device is in the first state in the case that a first operation is received by the electronic device; and the electronic device is in the second state in the case that a second operation that differs from the first operation is received by the electronic device.

After the step 102, the method in the embodiment of the application proceeds to step 103, that is, generating a first control instruction in the case that the current state is the first state, or generating a second control instruction in the case that the current state is the second state.

After the step 103, the method in this embodiment of the application proceeds to step 104, that is, performing a first control instruction to control the operating frequency of the CPU within the first maximum operating frequency, or performing a second control instruction to control the operating frequency of the CPU within the second maximum operating frequency. Specifically: performing the first control instruction to output a first maximum operating clock, so that the operating frequency of the CPU is controlled within the first maximum operating frequency, herein the first maximum operating clock corresponds to the first maximum operating frequency; or performing the second control instruction to output a second maximum operating clock, so that the operating frequency of a CPU is controlled within the second maximum operating frequency, herein the second maximum operating clock corresponds to the second maximum operating frequency.

Figure 2:
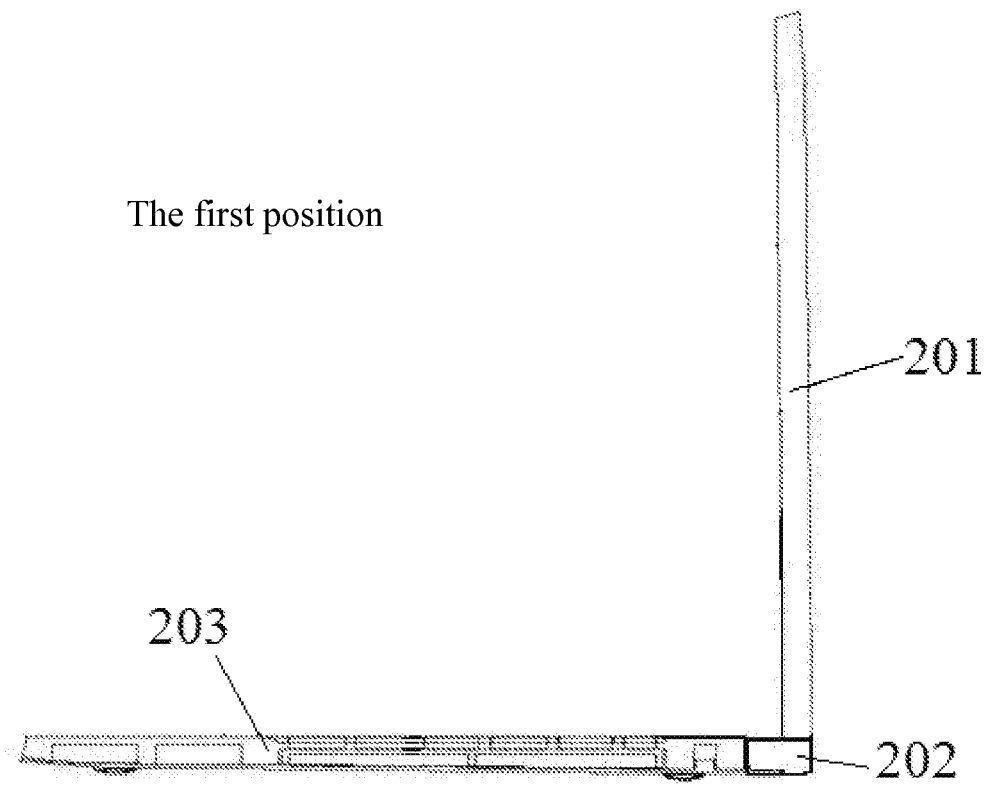
FIG. 2 is a schematic diagram of a first state and a second state of an electronic device according to the first embodiment of the application.
Figure 2:
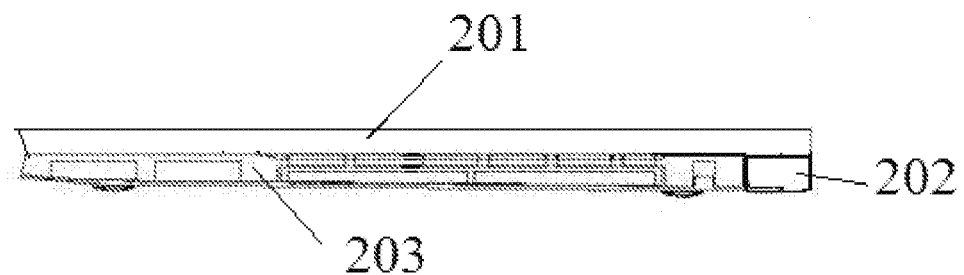

In order to describe the first state and the second state that differs from the first state of the electronic device more clearly, as shown in FIG. 2, the electronic device includes a display screen 201, a connection structure 202 and a main body 203 containing a CPU. The display screen 201 and the main body 203 can be rotated with respect to each other via the connection structure 202. In the case that the angle between the display screen 201 and the main body 203 is in the first preset angle range, such as the angle between the display screen 201 and the main body 203 is 180 degree, the electronic device is in the notebook computer state; and in the case that the angle between the display screen 201 and the main body 203 is in the second preset angle range, such as the angle between the display screen 201 and the main body 203 is 360 degree, the electronic device is in the tablet computer state. Or, in the case that the angle between the display screen 201 and the main body 203 is regulated from the first preset angle to the second preset angle, the electronic device is in the first state, and in the case that the angle between the display screen 201 and the main body 203 is regulated from the second preset angle to the first preset angle, the electronic device is in the second state.

Whether the electronic device is in the first state or in the second state that differs from the first state may also be related to the number of the applications running on the electronic device. For example, in the case that the number of the applications running on the electronic device meets the first preset condition, such as equal to or greater than 10, the electronic device is in the first state; and in the case that the number of the applications running on the electronic device does not meet the first preset condition, such as less than or equal to 10, the electronic device is in the second state.

Whether the electronic device is in the first state or in the second state that differs from the first state may also be related to whether the first operation is received by the electronic device. For example, the electronic device is in the first state in the case that the first button operation is detected, or the electronic device is in the second state in the case that the second operation that differs from the first operation such as another button operation is received by the electronic device.

Practically, in actual application, the types of the first operation and the second operation may also be a voice control operation or a touch screen operation and the like, and they are not restricted and enumerated specifically in the embodiment of the application.

In the following, taking the electronic device as an example, the implementation procedure of the method in the embodiment of the application will be described in detail.

Herein, in the specific implementation procedure, the current state of the electronic device can be obtained in step 101. For example, the electronic device obtains the relative position between the display screen 201 and the main body 203 through an angle sensor, and thus obtains the current state of the electronic device.

Practically, in another embodiment of the application, this can be implemented by a position sensor, a mechanical switch and the like. For example, firstly, a part of a position sensor may be placed in the display screen 201 of the electronic device, and the other part of the position sensor may be placed in the main body 203 of the electronic device; a part of a mechanical switch may also be placed in the display screen 201 of the electronic device, and the other part of the mechanical switch may be placed in the main body 203 of the electronic device; then, the relative position between the display screen 201 and the main body 203 is obtained by obtaining the relative position of a position sensor or a mechanical switch.

The electronic device can obtain the current state of the electronic device by detecting the number of applications running on the electronic device currently. It is assumed that the number of applications running on the electronic device is preset to 10, the electronic device is in the first state in the case that the number of applications running on the electronic device is more than 10; the electronic device is in the second state in the case that the number of applications running on the electronic device is less than 10.

Practically, in the embodiment, the preset number of applications may be set by a user, such as 8 or 12, and is not restricted in the application.

The electronic device can obtain the current state of the electronic device based on the received operation. For example, it is determined that the electronic device is in the first state in the case that the first operation of entering the first state such as CTRL++ is received by the electronic device; or it is determined that the electronic device is in the second state in the case that the second operation of entering the second state such as CTR-- is received by the electronic device.

Step 102: judging whether the current state is the first state or the second state.

Continuing to take the above embodiment, for example, whether the current state is the first state or the second state may be determined by judging whether the relative position between the display screen 201 and the main body 203 of the electronic device is within the first preset angle range or within the second preset angle range. Whether the electronic device is in the first state or in the second state is determined by judging whether the angle between the display screen 201 and the main body 203 of the electronic device is within the first preset angle range. For example, in the case that the first preset angle range corresponding to the first state is 0-180 degree and it is detected that the angle between the display screen 201 and the main body 203 of the electronic device is 180 degree, it may be determined that the electronic device is in the first state, and in the embodiment of the application, the first state is the notebook computer state; or in the case that the second preset angle range corresponding to the second state is 181-360 degree and it is detected that the angle between the display screen 201 and the main body 203 of the electronic device is 360 degree, it may be determined that the electronic device is in the second state, and in the embodiment of the application, the second state is the tablet computer state.

Whether the current state of the electronic device is the first state or the second state may also be determined by judging whether the angle between the display screen 201 and the main body 203 of the electronic device is regulated from the first preset angle range to the second preset angle or from the second preset angle range to the first preset angle range. in the case that the angle between the display screen 201 and the main body 203 of the electronic device is regulated from the first preset angle range to the second preset angle range, for example, the angle is regulated from 0 degree to 90 degree, the electronic device is in the notebook computer state; or in the case that the angle between the display screen 201 and the main body 203 is regulated from the second preset angle range to the first preset angle range, for example, the angle is regulated from 180 degree to 360 degree, the electronic device is in the tablet computer state.

Whether the electronic device is in the first state or the second state that differs from the first state may also be related to the number of applications running on the electronic device. For example, whether the electronic device is in the first state or the second state is determined by judging whether the number of the applications running on the electronic device meets the first preset value, for example, whether the number is equal to or more than 10. The electronic device is in the first state in the case that the number of the applications running on the electronic device is equal to or more than 10, or the electronic device is in the second state in the case that the number of the applications running on the electronic device is less than 10.

Whether the electronic device is in the first state or in the second state that differs from the first state may also be related to whether the first operation is received by the electronic device. For example, the electronic device is in the first state in the case that the first button operation is detected, or the electronic device is in the second state in the case that the second button operation that differs from the first button operation is detected. For example, a user may input the first operation in the electronic device as required such as CTRL++, and in this case, it is determined that the electronic device is in the notebook computer state; or a user may also input the second operation in the electronic device as required such as CTRL--, and in this case, it is determined that the electronic device is in the tablet computer state;

Step 103: generating the first control instruction in the case that the current state is the first state, or generating the second control instruction in the case that the current state is the second state.

Continuing to take the above embodiment, the first control instruction such as a high level signal is generated in the case that the current state is the first state, or the second control instruction such as a low level signal is generated in the case that the current state is the second state.

Step 104: performing the first control instruction to control the operating frequency of the CPU within the first maximum operating frequency or performing the second control instruction to control the operating frequency of the CPU within the second maximum operating frequency. Specifically: the first control instruction is performed to output a first maximum operating clock, so that the operating frequency of the CPU is controlled within the first maximum operating frequency, herein the first maximum operating clock corresponds to the first maximum operating frequency; or the second control instruction is performed to output a second maximum operating clock, so that the operating frequency of a CPU is controlled within the second maximum operating frequency, herein the second maximum operating clock corresponds to the second maximum operating frequency.

Continuing to take the above embodiment, the electronic device performs the high level signal to output a first maximum operating clock $t1$, so that the operating frequency of the CPU is controlled within the first maximum operating frequency $f1$, herein the relation between the first maximum operating clock $t1$ and the first maximum operating frequency $f1$ is $f1=c/t1$, with c being a constant. The electronic device performs the low level signal to output a second maximum operating clock $t2$, in order to control the operating frequency of the CPU within the second maximum operating frequency $f2$, herein the relation between the second maximum operating clock $t2$ and the second maximum operating frequency $f2$ is $f2=c/t2$.

In the case that the current state of the electronic device is the first state, the first maximum operating frequency of the electronic device in the first state is high, so the power consumption of the electronic device in the first state is huge and the heat dissipation is large in amount. Therefore, if the electronic device works in the first maximum operating frequency for a long time, the occurrence of the fault of the CPU will be caused.

In the case that the current state of the electronic device is the second state, the second maximum operating frequency of the electronic device in the second state is low, so in the case that the electronic device is in the second state, the waste of processing resources is reduced and the utilization ratio of the CPU is improved. Since the operating frequency of the CPU is low and the power consumption is low, thus the amount of heat dissipation is low, and the problem of high heat dissipation can be solved, and the lifetime of the CPU can be prolonged.

Second Embodiment

Figure 3:
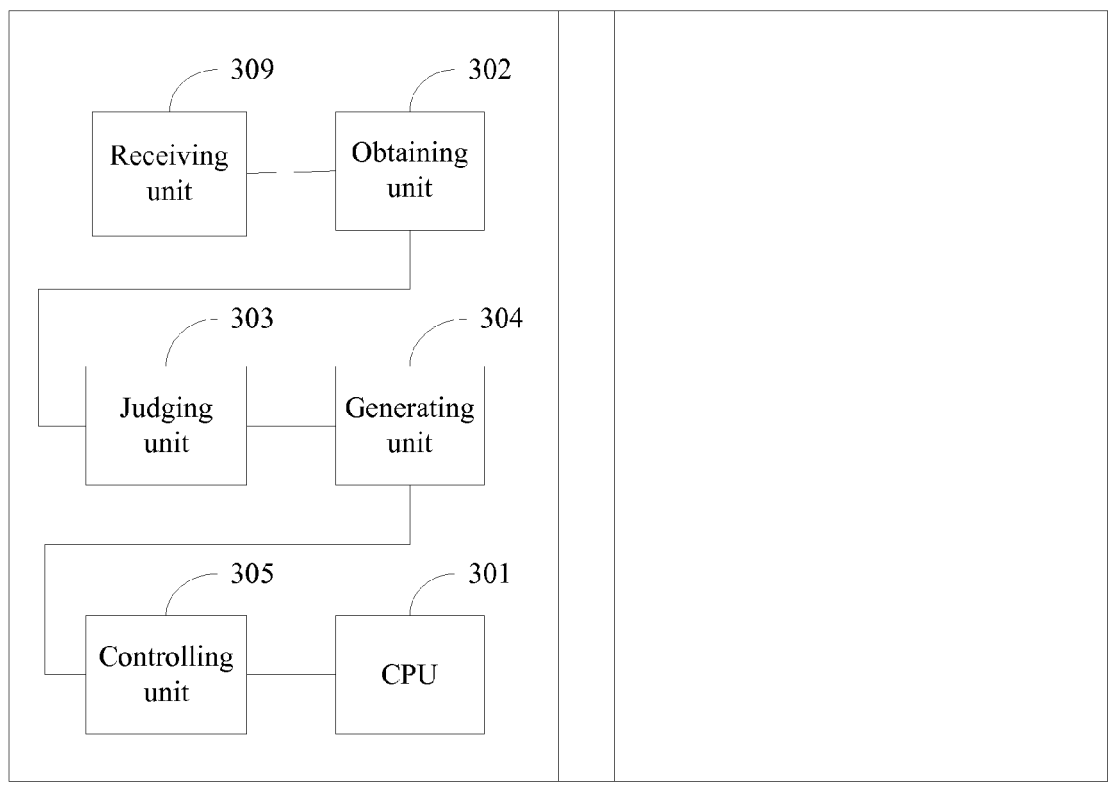
FIG. 3 is a structural diagram of an electronic device according to a second embodiment of the application.

According to the second embedment of the application, it is provided an electronic device. The electronic device is adapted to implement the method in FIG. 1 and the first embodiment. Referring to FIG. 2 and FIG. 3, FIG. 3 is a structural diagram of the electronic device according to the embodiment.

As shown in FIG. 2 and FIG. 3, the electronic device according to the embodiment includes a CPU 301, and the electronic device has a first state and a second state that differs from the first state. The operating frequency of the CPU 301 includes a first maximum operating frequency matching the first state and a second maximum operating frequency matching the second state, herein the first maximum operating frequency is higher than the second maximum operating frequency. The electronic device also includes: an obtaining unit 302 adapted to obtain the current state of the electronic device; a judging unit 303 adapted to judge whether the current state of the electronic device is the first state or the second state; a generating unit 304 adapted to generate a first control instruction in the case that the current state is the first state or generate a second control instruction in the case that the current state is the second state; a controlling unit 305 adapted to perform the first control instruction to control the operating frequency of the CPU within the first maximum operating frequency or perform the second control instruction to control the operating frequency of the CPU within the second maximum operating frequency.

Further, the electronic device also includes: a first section 201; a connection structure 202; and a second section 203. Specifically, the first section 201 and the second section 203 can be rotated with respect to each other via the connection structure 202. The electronic device is in the first state in the case that the relative position between the display screen 201 and second section 203 is in the first position; the electronic device is in the second state in the case that the relative position between the display screen 201 and second section 203 is in the second position that differs from the first position; or the electronic device is in the first state in the case that the electronic device is regulated from the first position to the second position; and in the case that the electronic device is regulated from the second position to the first position, the electronic device is in the second state.

Further, the electronic device is in the first state in the case that the number of the applications running on the electronic device meets the first preset condition; and the electronic device is in the second state in the case that the number of the applications does not meet the first preset condition.

Further, the electronic device also includes: a receiving unit 309 adapted to receive the first operation. The electronic device is in the first state in the case that the first operation is received by the electronic device; and the electronic device is in the second state in the case that the second operation that differs from the first operation is received by the electronic device.

Further, a controlling unit 305 in this embodiment is adapted specifically to perform the first control instruction to output a first maximum operating clock, so that the operating frequency of the CPU is controlled within the first maximum operating frequency, herein the first maximum operating clock corresponds to the first maximum operating frequency; or adapted to perform the second control instruction to output a second maximum operating clock, so that the operating frequency of the CPU is controlled within the second maximum operating frequency, herein the second maximum operating clock corresponds to the second maximum operating frequency.

The various variations of the method in the aforementioned embodiment are applied to the electronic device in the embodiment as such. The implementation method of the electronic device in this embodiment can be understood by those ordinary skilled in the art clearly based on the detail description of the aforementioned method, and will not be described again for the simple of the description.

One or more technical solutions according to embodiments of the application have at least the following technical effects or advantages.

In embodiments of the application, since the electronic device can judge whether the current state is the first state or the second state by obtaining the current state of the electronic device. In the case that the current state is the first state, the electronic device can generate the first control instruction and perform the first control instruction to control the operating frequency of the CPU within the first maximum operating frequency; and in the case that the current state is the second state, the electronic device can generate the second control instruction and perform the second control instruction to control the operating frequency of the CPU within the second maximum operating frequency, the maximum operating frequency of the electronic device can be reduced in a specific state, therefore the technical problem in the prior art that an electronic device can not perform adaptive regulation on the operating frequency of the CPU based on the usage state of the electronic device is solved effectively, and the maximum operating frequency of the CPU can be regulated adaptively based on the current state of the electronic device, the waste of processing resource can be reduced and the utilization ratio of the a CPU can be improved.

Further, since the electronic device may reduce the maximum operating frequency of the CPU adaptively in the second state, thus the problem of high heat dissipation can be solved and the lifetime of the CPU can be prolonged.

Further, since the first state may be that the relative position between the first section and the second section of the electronic device is in the first position, may also be that the electronic device is regulated from the first position to the second position different from the first position, may also be that the number of the applications running on the electronic device meets the first preset condition, and may also be that the first operation is received by the electronic device, and since the second state may be that the relative position between the first section and the second section of the electronic device is in the second position different from the first position, may also be that the electronic device is regulated from the second position to the first position, may also be that the number of the applications running on the electronic device does not meet the first preset condition, and may also be that the second operation different from the first operation is received by the electronic device, thus in various states of the electronic device, the waste of processing resource of the CPU can be further reduced and the utilization ratio of the CPU can be further improved, and then the problem of high heat dissipation can be further solved and the lifetime of the CPU can be further prolonged.

According to an embodiment of the application, it is further provided an electronic device, and the heat dissipation performance of the electronic device can be improved by an optimizing design.

Third Embodiment

Figure 4:
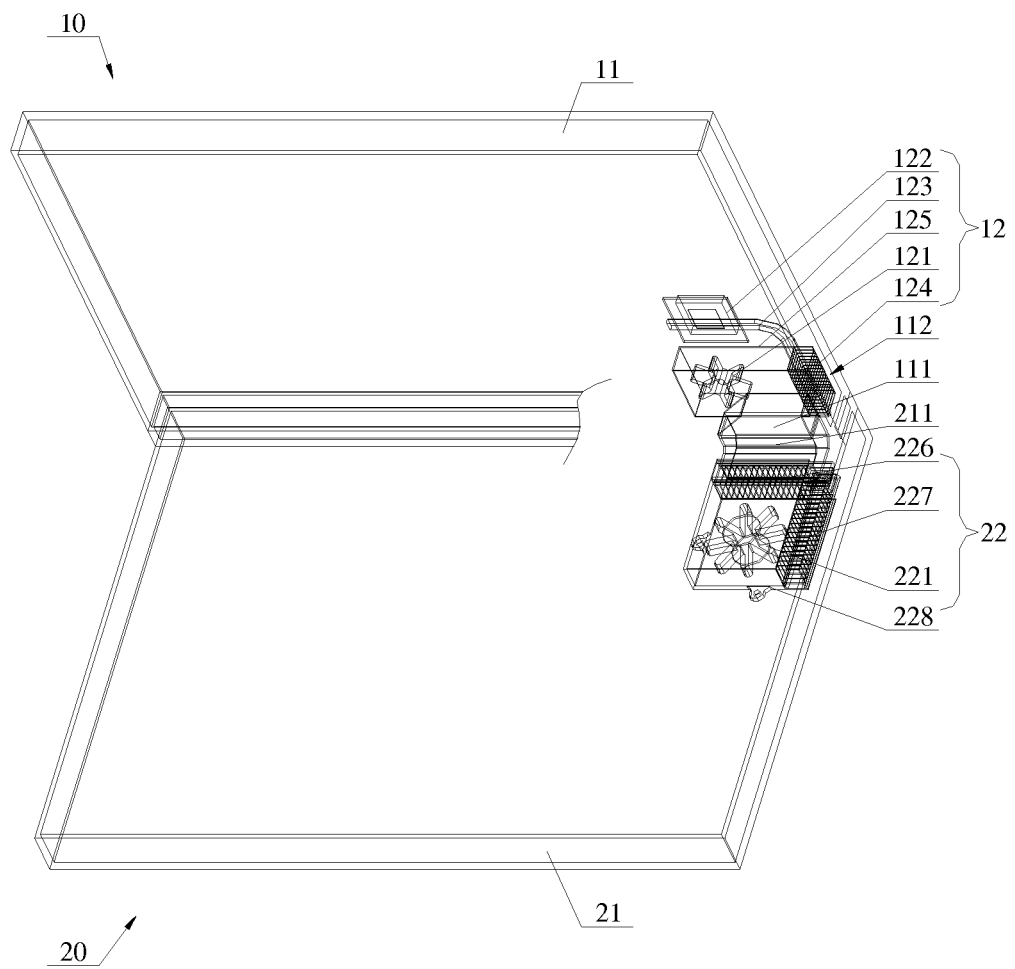
FIG. 4 is a schematic diagram of an overall structure of an electronic device according to an embodiment of the application.

Generally, the embodiment is described by taking the electronic device as shown in FIG. 4 as an example.

FIG. 4 illustrates a schematic diagram of an overall structure of the electronic device according to the embodiment. The electronic device in the embodiment is described by taking a notebook computer as an example.

The notebook computer consists of a tablet computer 10 used as a first section and a base 20 used as a second section. The tablet computer 10 is removably connected with the base 20 to achieve the switching between the two states. FIG. 4 illustrates a state of a conventional notebook computer after the tablet computer 10 and base 20 are connected, and the other state is a state in which a touch screen is used to input after the tablet computer 10 is removed from the base 20. The processing system of the notebook computer may be set in different ways, for example, the tablet computer 10 and the base 20 may both have the processing system, or only the tablet computer 10 has the processing system.

Figure 5:
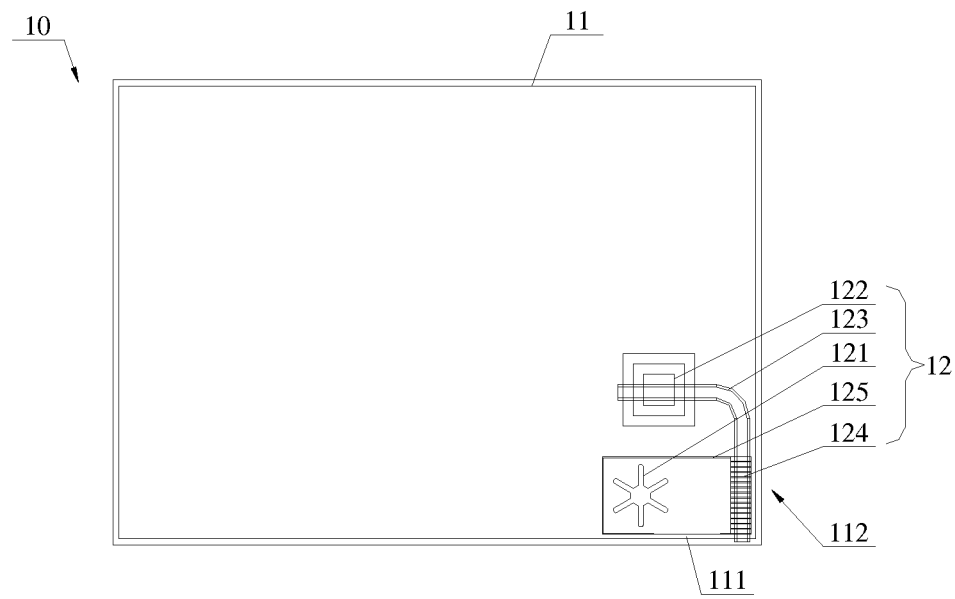
FIG. 5 is a schematic diagram of a first portion of an electronic device according to an embodiment of the application.
Figure 6:
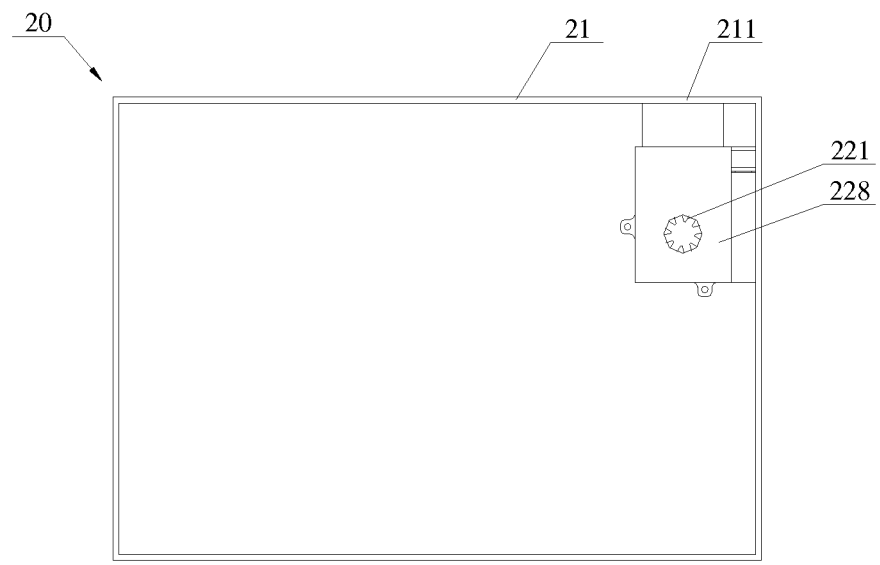
FIG. 6 is a schematic diagram of a second portion of an electronic device according to an embodiment of the application.

The following description is mainly based on the technical details of the heat dissipation of the tablet computer 10 and the base 20. FIG. 5 and FIG. 6 are referred to, where FIG. 5 is a schematic structure diagram of the tablet computer used as the first section according to the embodiment, and FIG. 6 is a schematic structure diagram of the base used as the second section according to the embodiment.

As shown in the figures, a first heat dissipation channel is provided in the tablet computer 10. In the disconnected state shown in FIG. 2, the heat dissipation airflow carries the operation heat of the interior heating element out of the tablet computer 10. A second heat dissipation channel is provided in the base 20, and in the connected state shown in FIG. 1, a second air outlet of the second heat dissipation channel 211 communicates with a first air inlet of the first heat dissipation channel 111, and the heat dissipation airflow may enter into the first heat dissipation channel through the second heat dissipation channel, therefore the heat dissipation of the first section is performed by the second heat dissipation channel and the first heat dissipation channel. For the solution that the processing system is only provided on the tablet computer 10, there is no main heating element in the base 20, the second heat dissipation channel is mainly used to supply the heat dissipation airflow to the first heat dissipation channel in order to perform heat dissipation of the tablet computer 10 under the connected state, therefore the heat dissipation effect of the tablet computer 10 is improved. If a functional element such as a CD driver or a battery is provided in the base 20, the second heat dissipation channel may be used for the necessary heat dissipation of the operation heat of the tablet computer 10 and the base 20, or the second heat dissipation channel may only provide the heat dissipation airflow for the operation heat of the tablet computer 10.

Furthermore, since part of the dissipation function of the tablet computer 10 may be undertaken by the second heat dissipation channel, the heat dissipation capacity of the first heat dissipation channel may be set to be lower than the heating amount in the maximum power consumption state, for the tablet computer 10 which has the same heating amount in the maximum power consumption state. Therefore, the dissipation parameter of the first heat dissipation channel provided in the tablet computer 10 may be lowered and the occupied space of the first heat dissipation channel is decreased, and thus the design of the tablet computer 10 can meet the requirements for lightweight and thinning design.

Particularly, the first heat dissipation channel is formed with the first air inlet 111 on the first case 11 of the tablet computer 10 as the upstream end, and the first air inlet 111 is provided on the side of the first case 11 connecting with the base 20. The second heat dissipation channel is formed with the second air outlet 211 on the second case 21 of the base 20 as the downstream end, and the second air outlet 211 is provided on the side of the second case 21 connecting with the tablet computer 10. In a case that the first interface of the tablet computer 10 is connected with the second interface of the base 20, the first air inlet 111 communicates with the second air outlet 211.

In this solution, in a case that the heat dissipation of the tablet computer 10 is performed, the heat dissipation airflow may be formed through both the first heat dissipation channel and the second heat dissipation channel in order to carry the operation heat of the tablet computer 10 out of the tablet computer 10. In a case that the heat dissipation of both the tablet computer 10 and the base 20 is performed, the heat dissipation airflow formed through the second head dissipation channel, besides carrying the operation heat of the tablet computer 10 out of the tablet computer 10, may also carry the operation heat of the base 20 out of the base 20. The particular implementation may be different according to the power consumption of the device. For example, the heat dissipation channel only has a basic airflow path formed according to temperature difference, and the heat dissipation airflow is formed in a passive and uncontrollable manner, i.e., a heat pipe radiator is provided in the heat dissipation channel or no radiator is provided in the heat dissipation channel. Alternatively, a radiator with a fan or a refrigerating radiator may be provided in the heat dissipation channel, and the heat dissipation airflow is formed in an active and controllable manner.

Based on the control manner, there are four solutions for the first heat dissipation channel and the second heat dissipation channel, as shown in the following table:

|  | solution 1 | solution 2 | solution 3 | solution 4 |
| --- | --- | --- | --- | --- |
| the first heat dissipation channel | active and controllable | active and controllable | passive and uncontrollable | passive and uncontrollable |
| the second heat dissipation channel | active and controllable | passive and uncontrollable | active and controllable | passive and uncontrollable |

Apparently, the solution 1 has a best heat dissipation performance compared with the other three solutions (solution 2, solution 3 and solution 4) since both two heat dissipation channels in the solution 1 form the heat dissipation airflow in the active and controllable manner. Specifically, a first radiator 12 may be provided in the first heat dissipation channel, and a second radiator 22 may be provided in the second heat dissipation channel, in order to improve the heat conducting efficiency between the corresponding heating element in the main body and the heat dissipation airflow in the first heat dissipation channel and/or the second heat dissipation channel. It should be noted that the above two radiators may be selected according to actual needs. For example, the radiator may be a heat pipe radiator, a semiconductor radiator or an independent fan, as long as the functional requirement for improving the heat exchange efficiency is met.

As described above, if the tablet computer 10 is connected with the base 20, the second heat dissipation channel in the base 20 and the first heat dissipation channel function together in the heat dissipation process of the tablet computer 10. Particularly, the second radiator 22 in the second heat dissipation channel may cause the second heat dissipation channel to output a heat dissipation airflow with the heat dissipation parameter of the first air inlet 111 improved, that is to say, the second radiator 22 may facilitate to optimize the heat dissipation parameter of the heat dissipation airflow outputted from the second heat dissipation channel to the first air inlet 111.

Optionally, the second radiator 22 causes the second heat dissipation channel to output a heat dissipation airflow with the temperature of the first air inlet 111 decreased or with the air flow speed of the first air inlet 111 increased. The second radiator 22 may also cause the second heat dissipation channel to output a heat dissipation airflow with the temperature of the first air inlet 111 decreased and with the air flow speed of the first air inlet 111 increased. The solutions, as long as meeting the functional requirement of effectively improving the heat dissipation parameter of the heat dissipation airflow, are all within the protective scope of the application.

The removable connection between the tablet computer 10 and the base 20 is achieved by a first interface (not shown in the drawings) on the first case 11 and a second interface (not shown in the drawings) on the second case 12. The first interface and the second interface matching to each other may have different structures, as long as the removable connection can be achieved. For the development trend of lightweight and thinning design, further optimization may be made on the basis of the above structure. Particularly, the first air inlet 111 of the first case 11 may be integrated into the first interface; correspondingly, the second air outlet 211 of the second case 21 may be integrated into the second interface. For example, the first air inlet 111 and the second air outlet 211 for building the heat dissipation airflow path, with a hooking manner as the interface mating manner, may be integrated into corresponding interfaces, this structure is compact and does not need to occupy the space in the width direction of the computer, and thus the requirement for lightweight and thinning design is met.

Furthermore, cables for supplying power and transmitting control signals between the tablet computer 10 and the base 20 may be provided in the matched first interface and second interface. It will be understood that the above cables may not be provided between the tablet computer 10 and the base 20, i.e., the power may be supplied separately by the tablet computer 10 and the base 20 themselves and the control signals may be wirelessly transmitted.

In the solution, the tablet computer 10 may be switched between different power consumption states as needed. A first detection unit 13 of the tablet computer 10 detects the connection state between the tablet computer 10 and the base 20, and outputs an acquired signal about the connection state to a processing unit 14 of the tablet computer 10. The processing unit 14 generates a switching instruction according to the connection state so as to switch the tablet computer 10 from a first state to a second state. The tablet computer 10 in the first state may operate in a first power consumption state, and the tablet computer 10 in the second state may operate in a second power consumption state. The first power consumption is greater than the second power consumption. That is, the tablet computer 10 in the first state may operate at a high power consumption; the heat dissipation function of the tablet computer 10 in the second state may be achieved by both the second heat dissipation channel and the first heat dissipation channel and the tablet computer 10 may operate at a low power consumption. The second power consumption is a ceiling limit value of the power consumption in the second state, and the first power consumption is a ceiling limit value of the power consumption in the first state.

The tablet computer 10 in the first power consumption state may perform a corresponding heat dissipation strategy automatically. A second detection unit 15 of the tablet computer 10 detects the high power consumption parameter of the tablet computer 10 and transmits the acquired signal about the high power consumption parameter to the processing unit 14. The processing unit 14 generates a second heat dissipation instruction according to the high power consumption parameter to start the second radiator in the second heat dissipation channel. Apparently, the second radiator should be an active and controllable heat dissipation device, for example, the second radiator may be a controllable fan or a controllable refrigerating radiator, so the heat dissipation effect of the tablet computer 10 is further improved and the tablet computer 10 can reliably operate in the first power consumption state in security.

In order to effectively control the cost of the heat dissipation, the second radiator 22 may be started by controlling the second fan 221 of the second radiator 22. The first fan 121 of the first radiator 12 may be selectively started at the same time according to the current power consumption, in order to maximumly improve the heat dissipation performance in the high power consumption state.

It should be understood that, the standard for determining the first power consumption state is different according to the model of the device, and the principle for determining the first power consumption state may also be different according to the control strategy. For example, whether the tablet computer operates in the first power consumption state may be determined according to the operation state of the interior heating elements such as the double-core processor or the graphics card or according to the high power consumption parameters such as the interior temperature detection result, and a corresponding heat dissipation strategy is selected according to the result of the determination. For another example, if the tablet computer 10 operates at a low power consumption, it is not necessary to start the first radiator 12 and the second radiator 22, i.e., the heat dissipation airflow formed by the natural temperature difference can meet the requirement; and if the tablet computer 10 operates at a middle power consumption, starting only the first fan 121 of the first radiator 12 can meet the requirement.

As described above, the structure of the first radiator 12 may be different from the structure of the second radiator 22. Considering the two designing requirements of manufacturing cost and heat dissipation performance, the first radiator 12 is preferably a heat pipe radiator for saving the manufacturing cost, and the second radiator 22 is preferably a semiconductor radiator for improving the heat dissipation performance. The first radiator 12 and the second radiator 22 may be other radiators, and of course may respectively be a first heat pipe radiator and a second semiconductor radiator.

Referring to FIG. 4 and FIG. 5, the heat pipe radiator includes: a heat conducting plate 122 whose bottom surface is connected with the top surface of an interior heating element, a first heat pipe 123, a first heat dissipation fin 124 and a first fan 121 arranged oppositely to the first heat dissipation fin 124. The evaporation end of the first heat pipe 123 is connected with the heat conducting plate 122, and the condensation end of the first heat pipe 123 is connected with the first heat dissipation fin 124. During the operation, the operation heat of the interior heating element is transferred to the first heat dissipation fin 124 via the first heat pipe 123, and is subject to heat exchange with the first heat dissipation fin 124 by the heat dissipation airflow formed after starting the first fan 121, and then is transferred out of the device.

A first air outlet at the downstream end of the first heat dissipation channel is provided on the first case 11, and the first air outlet 112 may be provided at one or more locations. Optionally, the first air outlet 112 is provided on the first case 11 beside the first heat dissipation fin 124. A second air inlet (not shown in the drawings) at the upstream end of the second heat dissipation channel is provided on the second case 21, and similarly, the second air inlet may be provided at one or more locations.

As well known, the heat area of the tablet computer 10 is centralized at the location of the heating elements. The first heat dissipation fin 124 and the first fan 121 may be covered by a heat pipe radiator case 125. The air inlet of the heat pipe radiator case 125 communicates with the first air inlet 111 of the first case 11, and the air outlet of the heat pipe radiator case 125 communicates with the first air outlet 112 of the first case 11. Therefore, good guiding for the heat dissipation airflow is established to improve the heat dissipation effect.

Figure 7:
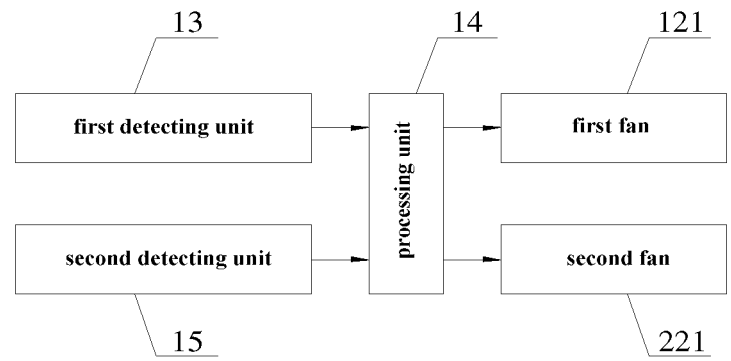
FIG. 7 illustrates an operation block diagram of a method for switching use state of an electronic device according to an embodiment of the application.
Figure 8:
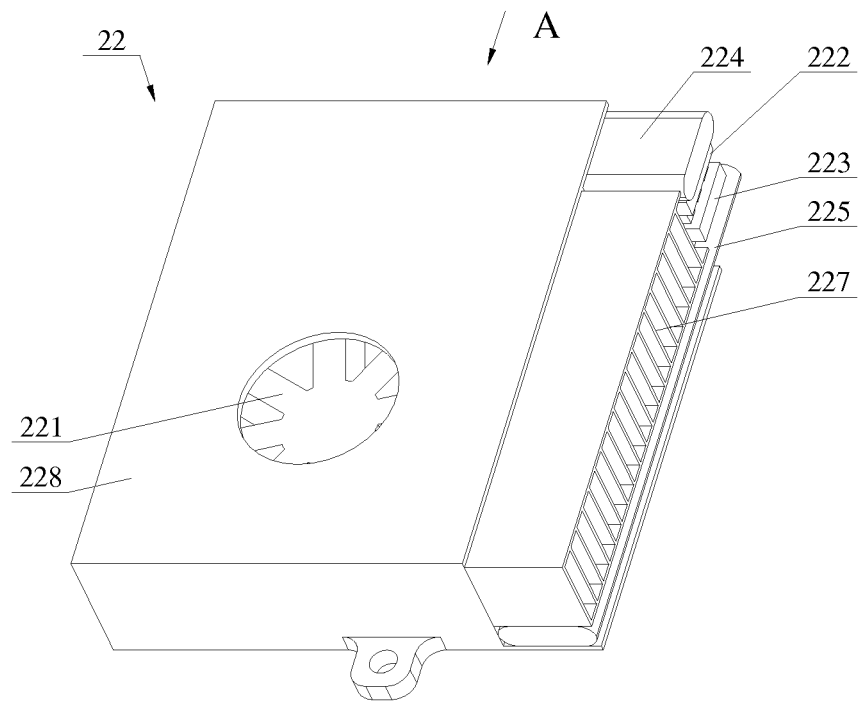
FIG. 8 is a schematic diagram of an overall structure of a semiconductor radiator according to an embodiment of the application.
Figure 9:
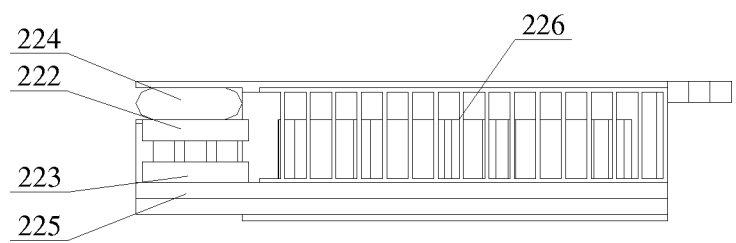
FIG. 9 is a view of FIG. 8 in direction A.

Please refer to FIG. 4, FIG. 7, FIG. 8 and FIG. 9, where FIG. 8 is a schematic diagram of an overall structure of a semiconductor radiator according to the embodiment, and FIG. 9 is a view of FIG. 8 in direction A.

The semiconductor refrigerator has a cold surface 222, a hot surface 223 and a refrigerating element (not shown in the drawings) between the cold surface 222 and the hot surface 223. Two second heat pipes are respectively the first pipe 224 and the second pipe 225, where the condensation end of the first pipe 224 is connected with the cold surface 222 of the semiconductor refrigerator, the evaporation end of the second pipe 225 is connected with the hot surface 223 of the semiconductor refrigerator, and the through flow directions of the first pipe 224 and the second pipe 225 are interlaced in the projection plane parallel to the cold surface 222 and the hot surface 223. Two second heat dissipation fins are respectively the first fin 226 and the second fin 227 and are arranged correspondingly to the first pipe 224 and the second pipe 225 respectively, the first fin 226 is connected with the evaporation end of the first pipe 224, the second fin 227 is connected with the condensation end of the second pipe 225, and the second fan 221 of the radiator is arranged oppositely to the two second heat dissipation fins to form corresponding heat dissipation airflows. During the operation, the refrigerating element (refrigerating core) refrigerates under electric drive, and the cold surface 222 and the hot surface 223 are formed correspondingly. Low temperature is transferred to the first fin 226 via the first pipe 224, and high temperature is transferred to the second fin 227 via the second pipe 225. The surface temperature of the first fin 226 is lower than the environmental temperature, and thus the temperature of the heat dissipation airflow flowing through the first fin 226 is lower than the environmental temperature, then the heat dissipation airflow enters into the first air inlet 111 of the first heat dissipation channel via the second air outlet 211 of the second heat dissipation channel, and therefore the basic temperature of the heat dissipation airflow of the first air inlet 111 may be decreased.

Similarly, in order to establish good guiding for the heat dissipation airflow to improve the heat dissipation effect, the two second pipes, the two second heat dissipation fins and the second fan of the semiconductor radiator may be covered by a semiconductor radiator case 228, and an air inlet and two air outlets may be provided at the top plate of the semiconductor radiator case 228. The second fan 221 is provided at the air inlet, the first fin 226 and second fin 227 are respectively provided at the two air outlets, and an air outlet on the semiconductor radiator case 228 corresponding to the first fin 226 communicates with the second air outlet 211 of the second case 21, delivering the heat dissipation airflow with a temperature lower than the environmental temperature to the first heat dissipation channel of the tablet computer 10.

Fourth Embodiment

Referring to FIG. 4 and FIG. 5, a tablet computer 10 is further provided according to the embodiment.

The tablet computer 10 may be removably connected with a base 20 to be switch between two use states. In a similar way, except elements having the heat dissipation function, other interior functional element of the tablet computer 10 may be implemented using the existing technology. Particularly, a first heat dissipation channel is provided in the tablet computer 10 to form a heat dissipation airflow to deliver the operation heat of the interior heating element out of the tablet computer 10. The first heat dissipation channel is formed with the first air inlet 111 on the first case 11 of the tablet computer 10 as the upstream end, the first air inlet 111 is provided on the side of the first case 11 connecting the first base 20, such that the first air inlet 111 communicates with the second air outlet of the second dissipation channel of the base 20.

In this configuration, the first heat dissipation channel has an independent and complete heat dissipation function if the tablet computer 10 is used separately. In a cast that the tablet computer 10 and the base 20 are assembled together, the first heat dissipation channel communicates with the second dissipation channel to perform heat dissipation of the tablet computer 10. Therefore, the heat dissipation capacity of the first heat dissipation channel may be set to be lower than the heating amount in the maximum power consumption state, and the heat dissipation parameter of the first heat dissipation channel of the first section may be effectively controlled, therefore the occupied space of the first heat dissipation channel is greatly reduced.

In order to further improve the heat dissipation performance, the second heat dissipation channel communicating with the first air inlet 111 may output a heat dissipation airflow with the heat dissipation parameter improved. A first radiator 12 may be provided in the first heat dissipation channel to improve the heat dissipation performance of the first heat dissipation channel. Similarly, the radiator may be selected according to actual need, for example, the radiator may be a heat pipe radiator, a semiconductor radiator or an independent fan, as long as the functional requirement for improving the heat exchange efficiency is met.

Optionally, the first radiator 12 in the embodiment is a heat pipe radiator for saving the manufacturing cost. Referring to FIG. 4 and FIG. 5, the heat pipe radiator includes: a heat conducting plate 122 whose bottom surface is connected with the top surface of the interior heating element, a first heat pipe 123, a first heat dissipation fin 124 and a first fan 121 arranged oppositely to the first heat generating fin 124. The evaporation end of the first heat pipe 123 is connected with the heat conducting plate 122, and the condensation end of the first heat pipe 123 is connected with the first heat dissipation fin 124. During the operation, the operation heat of the interior heating element is transferred to the first heat dissipation fin 124 via the first heat pipe 123, and is subject to heat exchange with the first heat dissipation fin 124 through the heat dissipation airflow formed after starting the first fan 121, then is transferred out of the device.

A first air outlet 112 at the downstream end of the first heat dissipation channel is provided on the first case 11. The first air outlet 112 may be provided at one or more locations. Optionally, the first air outlet 112 is provided on the first case 11 beside the first heat dissipation fin 124. A second air inlet (not shown in the drawings) at the upstream end of the second heat dissipation channel is provided on the second case 21, and similarly, the second air inlet may be provided at one or more locations.

As well known, the interior heat area of the tablet computer 10 is centralized at the location of the heating elements. The first heat dissipation fin 124 and the first fan 121 may be covered by a heat pipe radiator case 125, the air inlet of the heat pipe radiator case 125 communicates with the first air inlet 111 of the first case 11, and the air outlet of the heat pipe radiator case 125 communicates with the first air outlet 112 of the first case 11. Therefore, good guiding for the heat dissipation airflow is established to improve the heat dissipation effect.

Furthermore, a first interface (not shown in the drawings) adapted to achieve the removable connection between the tablet computer 10 and the base 20 may be selected according to the actual structure, as long as the removable connection can be achieved. For the development trend of lightweight and thinning design, further optimization may be made on the basis of the aforementioned structure. The first air inlet on the first case 11 may be integrated into the first interface. For example, the first air inlet for building the heat dissipation airflow path, with a hooking manner as the interface mating manner, may be integrated into the corresponding interface, and thus the structure is compact.

The tablet computer 10 according to the embodiment may be switched between different power consumption states as required. The first detection unit 13 of the tablet computer 10 is used to detect the connection state between the tablet computer 10 and the base 20, and sends an acquired signal about the connection state to the processing unit 14 of the tablet computer 10. The processing unit 14 is used to generate a switching instruction according to the connection state, to switch the tablet computer 10 from a first state to a second state. The tablet computer 10 in the first state may operate in a first power consumption state, and the tablet computer 10 in the second state may operate in a second power consumption state. The first power consumption is greater than the second power consumption. That is, the tablet computer 10 in the second state may operate at a low power consumption; the heat dissipation function of the tablet computer 10 in the first state may be achieved by both the second heat dissipation channel and the first heat dissipation channel and the tablet computer 10 may operate at a high power consumption. The second power consumption is a ceiling limit value of the power consumption in the second operation state, and the first power consumption is a ceiling limit value of the power consumption in the first operation state.

The tablet computer 10 in the first power consumption state may perform a corresponding heat dissipation strategy automatically. The second detection unit 15 of the tablet computer 10 is adapted to detect the high power consumption parameter of the tablet computer 10 and send an acquired signal about the high power consumption parameter to the processing unit 14. The processing unit 14 generates a second heat dissipation instruction according to the high power consumption parameter so as to start the second radiator in the second heat dissipation channel. Therefore, the heat dissipation effect of the tablet computer 10 is improved and the tablet computer 10 can reliably operate in the first power consumption state in security.

It should be understood that the standard for determining the first power consumption state is different according to the model of the device, and the principle for determining the first power consumption state may also be different according to the control strategy. For example, whether the tablet computer operates in the first power consumption state may be determined according to the operation state of the interior heating elements such as the double-core processor or the graphics card or according to the high power consumption parameters such as the interior temperature detection result, and a corresponding heat dissipation strategy is selected according to the result of the determination. For another example, if the tablet computer 10 operates at a low power consumption, it is not necessary to start the first radiator 12 and the second radiator 22, i.e., the heat dissipation airflow formed by the natural temperature difference can meet the requirement; and if the tablet computer 10 operates at a middle power consumption, starting only the first fan 121 of the first radiator 12 can meet the requirement.

Fifth Embodiment

Referring to FIG. 4 and FIG. 6, a base 20 is further provided according to the embodiment.

The base 20 may be removably connected with the tablet computer 10 so as to switch the tablet computer between two states. Similarly, the base 20 may be provided with a processing system. For example, only the tablet computer 10 is provided with a processing system, i.e., the base 20 itself has no processing ability and only provides functions such as heat dissipation and/or Input/Output extension and/or additional power supply. It is also possible that each of the tablet computer 10 and the base 20 has a processing system, and in a connected state, the two processing system may operate according to actual matching.

Particularly, a second heat dissipation channel is provided in the base 20 to form an airflow to carry the operation heat of the interior heating elements out of the base. The second heat dissipation channel is formed with the second air outlet 211 on the second case 21 of the base 20 as the downstream end. The second air outlet 211 is provided on the side of the second case 21 connecting with the tablet computer 10, such that the second air outlet 211 communicates with the first air inlet 111 of the tablet computer 10, and the heat dissipation airflow is supplied to the tablet computer 10.

For further improving the heat dissipation performance, a second radiator 22 may be provided in the second heat dissipation channel, so as to improve the heat dissipation performance of the second heat dissipation channel itself and/or the tablet computer 10. Particularly, the second radiator 22 in the second heat dissipation channel may cause the second heat dissipation channel to output a heat dissipation airflow with the heat dissipation parameter of the first air inlet 111 improved, that is, the second radiator 22 may optimize the heat dissipation parameter of the heat dissipation airflow outputted to the first air inlet 111 via the second heat dissipation channel. It should be understood that the radiator may be selected according to actual need. For example, the radiator may be a semiconductor radiator or an independent fan, as long as the functional requirement for improving heat exchange efficiency can be met.

Optionally, the second radiator 22 is adapted to cause the second heat dissipation channel to output a heat dissipation airflow with the temperature of the first air inlet 111 decreased or with the air flow speed of the first air inlet 111 increased. The second radiator 22 may also be adapted to cause the second heat dissipation channel to output a heat dissipation airflow with the temperature of the first air inlet 111 decreased and with the air flow speed of the first air inlet increased. The solutions, as long as meeting the functional requirement of effectively improving the heat dissipation parameter of the heat dissipation airflow, are all within the protective scope of the application.

Optionally, the second radiator 22 in the embodiment is a semiconductor radiator for improving the heat dissipation performance. Please refer to FIG. 8 and FIG. 9.

The semiconductor refrigerator includes: a cold surface 222, a hot surface 223 and a refrigerating element (not shown in the drawings) between the cold surface 222 and the hot surface 223. Two second heat pipes are respectively a first pipe 224 and a second pipe 225, where the condensation end of the first pipe 224 is connected with the cold surface 222 of the semiconductor refrigerator, the evaporation end of the second pipe 225 is connected with the hot surface 223 of the semiconductor refrigerator, and the through flow directions of the first pipe 224 and the second pipe 225 are interlaced in the projection plane parallel to the cold surface 222 and the hot surface 223. Two second heat dissipation fins are respectively a first fin 226 and a second fin 227 and are arranged correspondingly to the first pipe 224 and the second pipe 225 respectively, the first fin 226 is connected with the evaporation end of the first pipe 224, the second fin 227 is connected with the condensation end of the second pipe 225, and the second fan 221 of the radiator is arranged oppositely to the two second heat dissipation fins to form corresponding heat dissipation airflows. During the operation, the refrigerating element (refrigerating core) refrigerates under electric drive, and the cold surface 222 and the hot surface 223 are formed correspondingly. Low temperature is transferred to the first fin 226 via the first pipe 224, and high temperature is transferred to second fin 227 via the second pipe 225. The surface temperature of the first fin 226 is lower than the environmental temperature, and thus the temperature of the heat dissipation airflow flowing through the first fin 226 is lower than the environmental temperature, then the heat dissipation airflow enters into the first air inlet 111 of the first heat dissipation channel via the second air outlet 211 of the second heat dissipation channel, and therefore the basic temperature of the heat dissipation airflow of the first air inlet 111 may be decreased.

Similarly, for establishing good guiding for the heat dissipation airflow to improve the heat dissipation effect, the two second pipes, the two second heat dissipation fins and the second fan of the semiconductor refrigerator may be covered by a semiconductor radiator case 228, and an air inlet and two air outlets are provided at the top plate of the semiconductor radiator case 228. The second fan 221 is provided at the air inlet, the first fin 226 and the second fin 227 are respectively provided at the two air outlets, and an air outlet on the semiconductor radiator case 228 corresponding to the first fin 226 communicates with the second air outlet 211 of the second case 21, and thus the heat dissipation flow with a temperature lower than the environmental temperature is delivered to the first heat dissipation channel of the tablet computer 10.

The starting of the aforementioned controllable second radiator 22 (a refrigerating radiator or a fan) is controlled by the processing unit 14 according to the current power consumption state. Particularly, in the first power consumption state, the second radiator 22 in the second heat dissipation channel starts by receiving a second heat dissipation instruction, and thus the heat dissipation effect of the tablet computer 10 is improved. The second heat dissipation instruction is generated by the processing unit 14 based on the high power consumption parameter, so that the tablet computer 10 can reliably operate in the second power consumption state in security. Similarly, the standard for determining the first power consumption state is different according to the model of the device, and the principle for determining the first power consumption may be different according to the control strategy.

In a cast that the amount of the operation heat in the base 20 is great, the second radiator 22 may also perform heat dissipation of the base 20 itself. However, even if the amount of the operation heat in the base 20 is great, the second radiator 22 may only perform heat dissipation of the matched tablet computer 10.

Sixth Embodiment

Besides the aforementioned notebook computer with the two states, a method for switching states of a tablet computer is provided according to the embodiment. FIG. 7 illustrates an operation block diagram of the method for switching the state of the tablet computer according to the embodiment.

The method for switching the state of the tablet computer includes the following steps S41 to S45.

S41, detecting whether the tablet computer is connected with the base 20 and acquiring a detection result.

S42, generating a switching instruction if the detection result indicates that the tablet computer 10 is connected with the base 20.

S43, switching the tablet computer 10 from the second state to the first state according to the switching instruction.

The tablet computer 10 in the first state may operate in the first power consumption state, the tablet computer 10 in the second state may operate in the second power consumption state, and the first power consumption is greater than the second power consumption.

On this basis, the method for switching the state may further include the step of adjusting and controlling the heat dissipation parameter.

S44, detecting the high power consumption parameter of the tablet computer 10.

S45, outputting a second heat dissipation instruction if the high power consumption parameter reaches a preset threshold, so as to start the second radiator 22 in the second heat dissipation channel. According to the high power consumption parameter related to a particular control strategy, the preset threshold may be defined as follows: the double-core processor operate at the same time, the single-core processor and the graphics card operate at the same time or a ceiling limit value of the interior temperature.

It is to be noted that, the step S44 and the step S45 for adjusting the heat dissipation parameter may be performed based on the tablet computer 10 in the first state, that is, no main heating element is provided in the base 20 and the second heat dissipation channel mainly supplies heat dissipation airflow for the tablet computer 10. If a heating element is provided in the base 20, the step of adjusting the heat dissipation parameter by starting the second radiator 22 is not limited to the aforementioned time sequence.

It is to be noted that the technical solution about the heat dissipation of the electronic device according to the application is applicable to the aforementioned notebook computer with two states, and also applicable to any electronic products in which a first section is removably connected with a second section.

Obviously, various modifications and variations can be made by those ordinary skilled in the art without deviating from the principle and scope of the application. So, if these modifications and variations fall within the scopes of the claims of the application and the equivalent technology thereof, the application is also intended to include these modifications and variations.

What is claimed is:

1. A control method, applied to an electronic device comprising a CPU, wherein the electronic device has a first state and a second state different from the first state;

wherein an operating frequency of the CPU comprises a first maximum operating frequency matching the first state and a second maximum operating frequency matching the second state, with the first maximum operating frequency being higher than the second maximum operating frequency;

wherein the method comprises:

obtaining a current state of the electronic device;

judging whether the current state is the first state or the second state;

generating a first control instruction in the case that the current state is the first state, or generating a second control instruction in the case that the current state is the second state; and performing the first control instruction to control the operating frequency of the CPU within the first maximum operating frequency or performing the second control instruction to control the operating frequency of the CPU within the second maximum operating frequency;

wherein the electronic device includes a first section and a second section, wherein the electronic device has the first state and the second state different from the first state, comprises:

the electronic device is in the first state in the case that the electronic device is adjusted from a first position to a second position different than the first position; and the electronic device is in the second state in the case that the electronic device is adjusted from the second position to the first position.

2. The method according to claim 1, wherein the electronic device has a first state and a second state different from the first state, further comprises:

the electronic device is in the first state in the case that the first section and the second section are in the first position; and the electronic device is in the second state in the case that the first section and the second section are in the second position.

3. The method according to claim 1, wherein the electronic device has the first state and the second state different from the first state, further comprises:

the electronic device is in the first state in the case that a first operation is received by the electronic device;

the electronic device is in the second state in the case that a second operation different from the first operation is received by the electronic device.

4. The method according to claim 1, wherein performing the first control instruction to control the operating frequency of the CPU within the first maximum operating frequency or performing the second control instruction to control the operating frequency of the CPU within the second maximum operating frequency, comprises:

performing the first control instruction to output a first maximum operating clock, so as the operating frequency of the CPU is controlled within the first maximum operating frequency, wherein the first maximum operating clock corresponds to the first maximum operating frequency; or performing the second control instruction to output a first maximum operating clock, so as the operating frequency of the CPU is controlled within the first maximum operating frequency, wherein the second maximum operating clock corresponds to the second maximum operating frequency.

5. An electronic device, comprising a CPU, wherein the electronic device has a first state and a second state different from the first state;

wherein an operating frequency of the CPU comprises a first maximum operating frequency matching the first state and a second maximum operating frequency matching the second state, with the first maximum operating frequency being higher than the second maximum operating frequency;

wherein the electronic device further comprises:

an obtaining unit adapted to obtain a current state of the electronic device;

a judging unit adapted to judge whether the current state of the electronic device is the first state or the second state;

a generating unit adapted to generate a first control instruction in the case that the current state is the first state or generate a second control instruction in the case that the current state is the second state;

a controlling unit adapted to perform the first control instruction to control the operating frequency of the CPU within the first maximum operating frequency or perform the second control instruction to control the operating frequency of the CPU within the second maximum operating frequency;

a first section;

a connection structure; and a second section, wherein the first section and the second section can be rotated with respect to each other via the connection structure; and wherein the electronic device is in the first state in the case that the electronic device is adjusted from a first position to a second position different than the first position, and the electronic device is in the second state in the case that the electronic device is adjusted from the second position to the first position.

6. The electronic device according to claim 5 wherein the electronic device is in the first state in the case that the first section and second section are in the first position, the electronic device is in the second state in the case that the first section and second section are in the second position.

7. The electronic device according to claim 5, further comprising:

a receiving unit adapted to receive an operation;

the electronic device is in the first state in the case that the receiving unit receives a first operation;

the electronic device in the second state in the case that the receiving unit receives a second operation.

8. The electronic device according to claim 5, wherein the controlling unit is adapted to perform the first control instruction to output a first operating clock, so as the operating frequency of the CPU is controlled within the first maximum operating frequency, wherein the first operating clock corresponds the first maximum operating frequency; or the controlling unit is further adapted to perform the second control instruction to output a second operating clock, so as the operating frequency of the CPU is controlled within the second maximum operating frequency, wherein the second operating clock corresponds the second maximum operating frequency.

9. The electronic device according to claim 6, wherein the first section comprises:

a first case, on which a first interface is provided, the first interface is adapted to be removably connected with a second interface of a second electronic device; and a processing unit, provided in the first case;

wherein a first air inlet is provided on a side of the first case connecting with the second section, and a first heat dissipation channel of the first section is formed with the first air inlet as an upstream end, and in a case that the first interface is connected with the second interface, the first air inlet communicates with a second air outlet of a second heat dissipation channel of the second section.

10. The electronic device according to claim 9, wherein a first radiator is provided in the first heat dissipation channel.

11. The electronic device according to claim 10, wherein the first radiator is a heat pipe radiator comprising: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

12. The electronic device according to claim 9, further comprising:
a first detection unit, adapted to detect the connection state between the first section and the second section;
wherein the processing unit is adapted to generate a switching instruction according to the connection state so as to switch the first section from a second state to a first state;
wherein the first section in the first state operates in a state of first power consumption, the first section in the second state operates in a state of second power consumption, and the first power consumption is greater than the second power consumption.

13. The electronic device according to claim 6, wherein the second section comprises:
a second case, on which a second interface is provided, the second interface is adapted to be removably connected with a first interface of a first section;
wherein a second air outlet is provided on a side of the second case connecting with the first section, a second heat dissipation channel of the second section is formed with the second air outlet as a downstream end, and in a case that the second interface is connected with the first interface, the second air outlet communicates with a first air inlet of a first heat dissipation channel of the first section.

14. The electronic device according to claim 6, further comprising:
a first heat dissipation channel provided in the first section; and
a second heat dissipation channel provided in the second section;
wherein in a case that the first section is not connected with the second section, a heat dissipation airflow passes through the first heat dissipation channel such that heat dissipation of the first section is performed; and
wherein in a case that the first section is connected with the second section, a first air inlet of the first heat dissipation channel communicates with a second air outlet of the second heat dissipation channel, a heat dissipation airflow enters into the first heat dissipation channel via the second heat dissipation channel such that heat dissipation of the first section is performed by the second heat dissipation channel and the first heat dissipation channel.

15. The electronic device according to claim 14, wherein a first radiator is provided in the first heat dissipation channel.

16. The electronic device according to claim 14, wherein a second radiator is provided in the second heat dissipation channel.

17. The electronic device according to claim 15, wherein the first radiator is a heat pipe radiator comprising: a heat conducting plate whose bottom surface is connected with a top surface of an interior heating element, a first heat pipe, a first heat dissipation fin and a first fan arranged oppositely to the first heat dissipation fin, where an evaporation end of the first heat pipe is connected with the heat conducting plate, and a condensation end of the first heat pipe is connected with the first heat dissipation fin.

18. The electronic device according to claim 16, wherein the second radiator is a semiconductor radiator comprising:
a semiconductor refrigerator, which has a cold surface, a hot surface and a refrigerating element disposed between the cold surface and the hot surface;
two second heat pipes, which are respectively a first pipe and a second pipe, where a condensation end of the first pipe is connected with the cold surface of the semiconductor refrigerator, an evaporation end of the second pipe is connected with the hot surface of the semiconductor refrigerator, and through flow directions of the first pipe and the second pipe are interlaced in a projection plane parallel to the cold surface and the hot surface;
two second heat dissipation fins, which are respectively a first fin and a second fin, and the first fin is connected with an evaporation end of the first pipe and the second fin is connected with a condensation end of the second pipe; and
a second fan arranged oppositely to the two second heat dissipation fins.

19. The method according to claim 1, wherein the electronic device has the first state and the second state different from the first state, comprises:
multiple applications running on the electronic device, the electronic device is in the first state in the case that the number of the applications meets a first preset condition; and
the electronic device is in the second state in the case that number of the applications does not meet the first preset condition.

20. The electronic device according to claim 5, wherein
the electronic device is in the first state in the case that the number of applications running on the electronic device meets a first preset condition; and
the electronic device is in the second state in the case that the number of applications running on the electronic device does not meet the first preset condition.

* * * * *